United States Patent
Kato et al.

(10) Patent No.: US 8,356,647 B2
(45) Date of Patent: Jan. 22, 2013

(54) PNEUMATIC TIRE

(75) Inventors: Daisuke Kato, Kodaira (JP); Daisuke Nohara, Kodaira (JP); Yuwa Takahashi, Kodaira (JP); Daisuke Nakagawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 685 days.

(21) Appl. No.: 12/303,179

(22) PCT Filed: Apr. 27, 2007

(86) PCT No.: PCT/JP2007/059222
§ 371 (c)(1),
(2), (4) Date: Jan. 7, 2009

(87) PCT Pub. No.: WO2007/141973
PCT Pub. Date: Dec. 13, 2007

(65) Prior Publication Data
US 2009/0242094 A1 Oct. 1, 2009

(30) Foreign Application Priority Data
Jun. 2, 2006 (JP) ................. 2006-154739

(51) Int. Cl.
*B60C 5/14* (2006.01)
(52) U.S. Cl. ......... 152/511; 152/450; 152/510; 152/565
(58) Field of Classification Search .............. 152/450, 152/510, 511, 512, 565
See application file for complete search history.

(56) References Cited

U.S. PATENT DOCUMENTS

| | | | | |
|---|---|---|---|---|
| 4,365,659 A | * | 12/1982 | Yoshida et al. | 152/510 |
| 4,883,722 A | * | 11/1989 | Coppens et al. | 428/625 |
| 5,173,341 A | * | 12/1992 | Shiratori et al. | 427/434.6 |
| 5,496,884 A | | 3/1996 | Weih et al. | |
| 5,499,670 A | * | 3/1996 | Billieres | 152/543 |
| 5,992,486 A | * | 11/1999 | Katsuki et al. | 152/510 |
| 6,024,816 A | * | 2/2000 | Yamakawa et al. | 156/123 |
| 6,062,283 A | * | 5/2000 | Watanabe et al. | 152/510 |
| 6,079,465 A | | 6/2000 | Takeyama et al. | |

(Continued)

FOREIGN PATENT DOCUMENTS

| | | |
|---|---|---|
| CN | 101068689 A | 11/2007 |
| EP | 0 722 850 A1 | 7/1996 |
| EP | 0 774 340 A1 | 5/1997 |
| EP | 1 419 903 A1 | 5/2004 |
| JP | 06-040207 A | 2/1994 |

(Continued)

OTHER PUBLICATIONS

Supplementary European Search Report issued in European Application No. 07742657.5-2425/2036743 dated Jul. 6, 2010 (6 pages).

*Primary Examiner* — Joseph Del Sole
*Assistant Examiner* — Seyed Masoud Malekzadeh
(74) *Attorney, Agent, or Firm* — Sughrue Mion, PLLC

(57) ABSTRACT

A pneumatic tire in which the average peel strength between the surface of (A) a layer of a single-layered or multi-layered film of a thermoplastic resin and (B) a rubbery elastic layer, which are used as the inner liner layer, is 6 kN/m or greater at −20° C., i.e., a pneumatic tire exhibiting excellent average peel strength between the surface of layer (A) and layer (B), which are used in combination as the inner liner layer exhibiting excellent gas barrier property and flexibility, at a low temperature and at the room temperature, is provided.

29 Claims, 1 Drawing Sheet

U.S. PATENT DOCUMENTS

| | | | |
|---|---|---|---|
| 6,132,870 A | 10/2000 | Halladay et al. | |
| 6,136,123 A | 10/2000 | Kaido et al. | |
| 6,179,941 B1 * | 1/2001 | Yamakawa et al. | 156/123 |
| 6,397,912 B1 * | 6/2002 | Watanabe et al. | 152/510 |
| 6,758,251 B2 * | 7/2004 | Bates et al. | 152/450 |
| 7,165,587 B2 * | 1/2007 | Tsukagoshi et al. | 152/512 |
| 2004/0039104 A1 * | 2/2004 | Bates et al. | 524/515 |
| 2004/0089388 A1 | 5/2004 | Fujino et al. | |
| 2004/0177909 A1 * | 9/2004 | Tsukagoshi et al. | 152/339.1 |
| 2004/0210005 A1 * | 10/2004 | Herberger et al. | 525/241 |
| 2005/0001418 A1 * | 1/2005 | Kanbe et al. | 280/806 |
| 2005/0072508 A1 * | 4/2005 | Takagi | 152/559 |
| 2005/0098251 A1 * | 5/2005 | Yukawa | 152/450 |
| 2005/0155686 A1 * | 7/2005 | Yukawa et al. | 152/450 |
| 2006/0000532 A1 * | 1/2006 | Sandstrom | 152/510 |
| 2006/0081318 A1 * | 4/2006 | Yamaguchi et al. | 152/340.1 |
| 2006/0089439 A1 * | 4/2006 | Miyazaki | 524/394 |
| 2006/0148942 A1 * | 7/2006 | D'Sidocky et al. | 524/105 |
| 2008/0124523 A1 | 5/2008 | Nohara et al. | |

FOREIGN PATENT DOCUMENTS

| | | | |
|---|---|---|---|
| JP | 07-040702 A | | 2/1995 |
| JP | 07-081306 A | | 3/1995 |
| JP | 09-505842 A | | 6/1997 |
| JP | 10-026407 A | | 1/1998 |
| JP | 2000-119615 A | | 4/2000 |
| JP | 2002-052904 A | | 2/2002 |
| JP | 2002-509966 A | | 4/2002 |
| JP | 2004-176048 A | | 6/2004 |
| JP | 2004276699 A | * | 10/2004 |
| JP | 2005-075010 A | | 3/2005 |
| JP | 2006-159522 A | | 6/2006 |
| JP | 2007-100003 A | | 4/2007 |
| WO | 95/13304 A1 | | 5/1995 |
| WO | 96/34736 A1 | | 11/1996 |
| WO | 99/50342 A1 | | 10/1999 |
| WO | 2006/059621 A1 | | 6/2006 |

* cited by examiner

PNEUMATIC TIRE

TECHNICAL FIELD

The present invention relates to a pneumatic tire. More particularly, the present invention relates to a pneumatic tire exhibiting excellent average peel strength between the surface of a layer of a single-layered or multi-layered film of a thermoplastic resin and a rubbery elastic layer, which are used in combination as the inner liner layer, at a low temperature and at the room temperature.

BACKGROUND ART

Heretofore, an inner liner layer which contains a butyl-based rubber exhibiting suppressed permeation of gases such as butyl rubber and a halogenated butyl rubber as the main component is disposed at the inner face of a pneumatic tire so that leak of the air is prevented and the internal pressure of the tire is kept constant. However, when the content of the butyl-based rubber is increased, strength of the rubber in the unvulcanized condition is decreased, and fracture and formation of holes tend to take place in rubber sheets. In particular, when the thickness of the inner liner is decreased, a problem arises in that the cord at the inner face of a tire tend to be exposed at the surface during production of the tire.

Therefore, the amount of the butyl-based rubber which can be used is naturally limited. When a rubber composition containing the butyl-based rubber described above is used, the inner liner layer is required to have a thickness of about 1 mm from the standpoint of the air barrier property. Due to this restriction, the weight of the inner liner layer occupies as great as about 5% of the weight of the entire tire. This causes a problem when the weight of the tire is decreased to improve the fuel economy of an automobile.

In response to the recent social requirement for saving energy, methods for decreasing the thickness of the inner liner layer are proposed so that the weight of an automobile can be decreased. For example, a method in which a nylon film layer or a vinylidene chloride layer is used as the inner liner layer in place of the conventional butyl-based rubber layer, is disclosed (for example, refer to Patent References 1 and 2). A method in which a film of a composition comprising a blend of a thermoplastic resin such as a polyamide-based resin and a polyester-based resin with an elastomer is used as the inner liner layer, is disclosed (for example, refer to Patent Reference 3).

However, although the weight of the tire can be decreased to some degree, the above methods have problems in that crack resistance and bending fatigue resistance are inferior to those of conventional layers of compositions containing butyl-based rubber, in particular, when the inner liner layer is used at a low temperature of 5° C. or lower since the matrix material is a crystallizable resin material, and that the process for producing the tire is complicated.

On the other hand, it is known that an ethylene-vinyl alcohol copolymer (hereinafter, referred to as EVOH, occasionally) exhibits an excellent gas barrier property. Since the air permeability of EVOH is one hundredths or smaller of the rubber composition for the inner liner comprising butyl-based rubber, the property for maintaining the internal pressure can be remarkably improved even when the thickness is 50 μm or smaller, and the decrease in the weight of the tire can also be achieved. Therefore, it is expected that the use of EVOH for the inner liner is effective for decreasing the air permeability of the pneumatic tire. For example, a pneumatic tire having an inner liner comprising EVOH is disclosed (for example, refer to Patent Reference 4).

However, when EVOH is used for the inner liner, fracture or formation of cracks takes place occasionally under deformation by bending since the modulus is much greater than that of rubber conventionally used for tires although a great effect of improving the property of maintaining the internal pressure is exhibited. Therefore, a problem arises in the use of the inner liner comprising EVOH in that, although the property for maintaining the internal pressure is remarkably improved before the tire is used, the tire after being used, which has been subjected to bending deformations due to rotation of the tire during the use, exhibits a decreased property for maintaining the internal pressure than that exhibited before being used.

To overcome the above problem, for example, an inner liner for use at the inner face of a tire, which comprises a resin composition comprising 60 to 99% by weight of an ethylene-vinyl alcohol copolymer having a content of 20 to 70% by mole of ethylene and a degree of saponification of 85% or greater and 1 to 40% by weight of a hydrophobic plasticizer, is disclosed (for example, refer to Patent Reference 5). However, the bending resistance is not always sufficiently satisfactory.

Therefore, development of an inner liner which exhibits a great bending resistance and enables to achieve a decrease in the thickness while the sufficient gas barrier property is maintained has been desired.

As the above inner liner, for example, a laminate obtained by integrally adhering a film or a sheet of a rubbery elastomer exhibiting excellent bending resistance and a film of a thermoplastic resin exhibiting excellent gas barrier property may be considered. It is required for this laminate that an excellent average peel strength between the layer of a rubbery elastomer and the layer of a film of a thermoplastic resin be exhibited.

[Patent Reference 1] Japanese Patent Application Laid-Open No. Heisei 7 (1995)-40702
[Patent Reference 2] Japanese Patent Application Laid-Open No. Heisei 7 (1995)-81306
[Patent Reference 3] Japanese Patent Application Laid-Open No. Heisei 10 (1998)-26407
[Patent Reference 4] Japanese Patent Application Laid-Open No. Heisei 6 (1994)-40207
[Patent Reference 5] Japanese Patent Application Laid-Open No. 2002-52904

DISCLOSURE OF THE INVENTION

Under the above circumstance, the present invention has an object of providing a pneumatic tire which exhibits an excellent average peel strength between the surface of a layer of a single-layered or multi-layered film of a thermoplastic resin and a rubbery elastic layer, which are used in combination as the inner liner layer exhibiting excellent gas barrier property and flexibility, at a low temperature and at the room temperature and which exhibits excellent performance in driving in cold areas and under an ordinary environment.

As the result of intensive studies by the present inventors to achieve the above object, it was found that the object could be achieved by integrally adhering a layer of a film of a specific thermoplastic resin and a layer of a specific rubbery elastomer. The present invention has been completed based on the knowledge.

The present invention provides:
(1) A pneumatic tire which comprises an inner liner layer comprising (A) a layer of a single-layered or multi-layered film of a thermoplastic resin disposed as an innermost layer in a radial direction of the tire and (B) a rubber elastic layer disposed at outside of layer (A) in a radial direction of the tire, wherein an average peel strength between a surface of the layer of a single-layered or multi-layered film of a thermoplastic resin of layer (A) and the rubbery elastic layer of layer (B) is 6 kN/m or greater at −20° C.;

(2) A pneumatic tire described in (1), wherein the layer of a single-layered or multi-layered film of a thermoplastic resin of layer (A) and the rubbery elastic layer of layer (B) disposed adjacent to layer (A) are adhered to each other via (C) an adhesive layer, and the average peel strength between the surface of layer (A) and layer (B) via layer (C) is 6 kN/m or greater at −20° C.;

(3) A pneumatic tire which comprises an inner liner layer comprising (A) a layer of a single-layered or multi-layered film of a thermoplastic resin disposed as an innermost layer in a radial direction of the tire and (B) a rubber elastic layer disposed at outside of layer (A) in a radial direction of the tire, wherein an average peel strength between a surface of the layer of a single-layered or multi-layered film of a thermoplastic resin of layer (A) and the rubbery elastic layer of layer (B) is 4 kN/m or greater at 23° C.;

(4) A pneumatic tire described in (3), wherein the layer of a single-layered or multi-layered film of a thermoplastic resin of layer (A) and the rubbery elastic layer of layer (B) disposed adjacent to layer (A) are adhered to each other via (C) an adhesive layer, and the average peel strength between the surface of layer (A) and layer (B) via layer (C) is 4 kN/m or greater at 23° C.;

(5) A pneumatic tire described in any one of (2) and (4), wherein the average peel strength between the surface of layer (A) and layer (B) disposed adjacent to layer (A) via layer (C) is 6 kN/m or greater at −20° C. and 4 kN/m or greater at 23° C.;

(6) A pneumatic tire described in any one of (1), (2) and (5), wherein the average peel strength is 10 kN/m or greater at −20° C.;

(7) A pneumatic tire described in any one of (3) to (5), wherein the average peel strength is 10 kN/m or greater at 23° C.;

(8) A pneumatic tire described in any one of (1) to (7), wherein the layer of a single-layered or multi-layered film of a thermoplastic resin of layer (A) comprises a layer consisting a modified ethylene-vinyl alcohol copolymer which is obtained by bringing 1 to 50 parts by weight of an epoxy compound into reaction with 100 parts by mass of an ethylene-vinyl alcohol copolymer having an ethylene content of 25 to 50% by mole;

(9) A pneumatic tire described in any one of (1) to (8), wherein a thermoplastic urethane-based elastomer is used for a surface layer of the layer of a single-layered or multi-layered film of a thermoplastic resin of layer (A);

(10) A pneumatic tire described in any one of (1) to (9), wherein butyl rubber or a halogenated butyl rubber is used for the rubbery elastic layer of layer (B);

(11) A pneumatic tire described in any one of (1) to (10), wherein a diene-based elastomer is used for the rubbery elastic layer of layer (B);

(12) A pneumatic tire described in any one of (1) to (11), wherein the surface of the layer of a single-layered or multi-layered film of a thermoplastic resin of layer (A) and the rubbery elastic layer of layer (B) disposed adjacent to layer (A) are adhered to each other by using (D) an adhesive composition constituting the adhesive layer of layer (C) disposed between layer (A) and layer (B);

(13) A pneumatic tire described in (12), wherein the adhesive composition of component (D) comprises (a) a rubber component and (b) at least one of poly-p-dinitrosobenzene and 1,4-phenylenedimaleimide as a crosslinking and auxiliary crosslinking agent in an amount of 0.1 part by mass or greater per 100 parts by mass of component (a);

(14) A pneumatic tire described in any one of (12) and (13), wherein the rubber component. of component (a) in the adhesive composition of component (D) comprises 10% by mass or greater of chlorosulfonated polyethylene;

(15) A pneumatic tire described in any one of (12) to (14), wherein the adhesive composition of component (D) further comprises 2 to 50 parts by mass of (c) a filler;

(16) A pneumatic tire described in (15), wherein the adhesive composition of component (D) comprises carbon black as the filler of component (c);

(17) A pneumatic tire described in any one of (12) to (16), wherein the rubber component of component (a) in the adhesive composition of component (D) comprises 50% by mass or greater of butyl rubber and/or a halogenated butyl rubber;

(18) A pneumatic tire described in any one of (12) to (17), wherein the adhesive composition of component (D) further comprises 0.1 part by mass or greater of (d) a vulcanization accelerator for rubber;

(19) A pneumatic tire described in (18), wherein the vulcanization accelerator for rubber of component (d) is a thiuram-based and/or substituted dithiocarbamate-based vulcanization accelerator;

(20) A pneumatic tire described in any one of (12) to (19), wherein the adhesive composition of component (D) further comprises (e) 0.1 part by weight or greater of (e) at least one of resins and low molecular weight polymers;

(21) A pneumatic tire described in (20), wherein the resin of component (e) is at least one resin selected from C5-based resins, phenol-based resins, terpene-based resins, modified terpene-based resins, hydrogenated terpene-based resins and rosin-based resins;

(22) A pneumatic tire described in (21), wherein the resin of component (e) is a phenol-based resin;

(23) A pneumatic tire described in (20), wherein the low molecular weight polymer of component (e) has a weight-average molecular weight of 1,000 to 100,000 as expressed by a weight-average molecular weight of corresponding polystyrene;

(24) A pneumatic tire described in (23), wherein the low molecular weight polymer of component (e) has a weight-average molecular weight of 1,000 to 50,000 as expressed by a weight-average molecular weight of corresponding polystyrene;

(25) A pneumatic tire described in any one of (20) to (24), wherein the low molecular weight polymer of component (e) is a polymer having double bond in a molecule;

(26) A pneumatic tire described in any one of (20) to (25), wherein the low molecular weight polymer of component (e) is a polymer having a styrene unit; and

(27) A pneumatic tire described in (26), wherein the low molecular weight polymer of component (e) is a styrene-butadiene copolymer.

Figure 1:
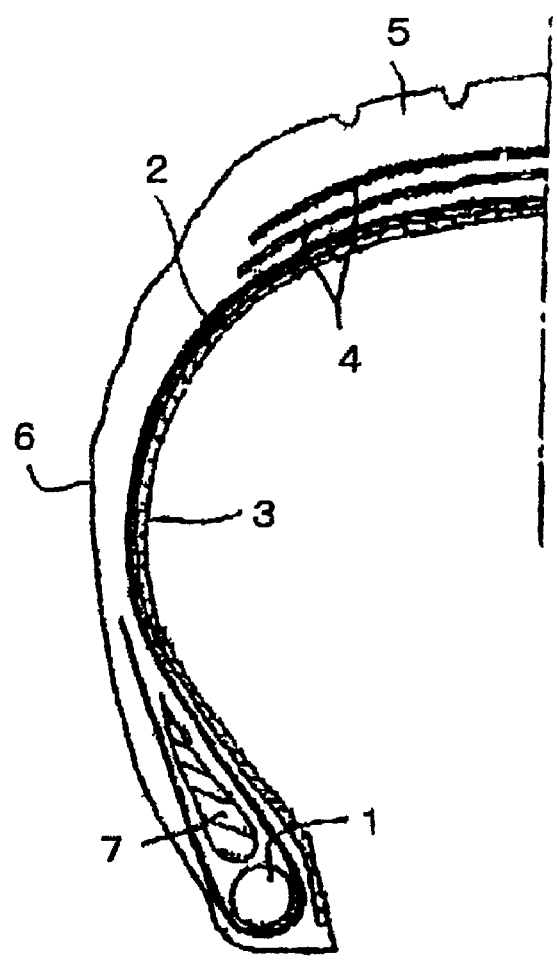
FIG. 1 shows a partial sectional view exhibiting an embodiment of the tire of the present invention.

IN THE FIGURES, REFERENCE NUMERALS MEAN AS FOLLOWS:

1: A bead core
2: a carcass layer
3: An inner liner layer
4: A belt portion
5: A tread portion
6: A side wall portion
7: A bead filler
11: A layer of a modified ethylene-vinyl alcohol copolymer
12a and 12b: Layers of a thermoplastic urethane-based elastomer
13: A layer of a film of a resin
14: An adhesive layer
15: A layer of a rubbery elastomer

THE MOST PREFERRED EMBODIMENT TO CARRY OUT THE INVENTION

In the pneumatic tire of the present invention, it is necessary that the average peel strength between the surface of (A) a layer of a single-layered or multi-layered film of a thermoplastic resin and (B) a rubbery elastic layer, which are used as the inner liner layer, be 6 kN/m or greater at −20° C. The upper limit of the average peel strength at −20° C. is not set strictly. In general, the upper limit is 20 kN/m.

As another aspect of the pneumatic tire of the present invention, it is necessary that the average peel strength between the surface of a layer of a single-layered or multi-layered film of a thermoplastic resin of layer (A) and a rubber elastic layer of layer (B) be 4 kN/m or greater at 23° C. The upper limit of the average peel strength at 23° C. is not set strictly. In general, the upper limit is 20 kN/m.

When the average peel strength at −20° C. and the average peel strength at 23° C. are in the respective ranges described above, problems caused by the inner liner can be suppressed and overcome in the use of the pneumatic tire in areas ranging from extremely cold areas to ordinary areas, and the decrease in the weight of the tire can be achieved.

It is preferable that the average peel strength satisfies both of 6 kN/m or greater at −20° C. and 4 kN/m or greater at 23° C. It is more preferable that the average peel strength satisfies both of 10 kN/m or greater at −20° C. and 10 kN/m or greater at 23° C.

As for the average peel strength at −20° C. and the average peel strength at 23° C., greater average peel strengths can be obtained by integrally adhering the surface of the layer of a single-layered or multi-layered film of a thermoplastic resin of layer (A) and the rubbery elastic layer of layer (B) via (C) an adhesive layer.

The thermoplastic film constituting layer (A) in the pneumatic tire of the present invention is not particularly limited as long as the thermoplastic film exhibits an excellent gas barrier property and has a suitable mechanical strength, and various resin films can be used. Examples of the raw material for the resin film include polyamide-based resins, polyvinylidene chloride-based resins, polyester-based resins, ethylene-vinyl alcohol copolymer-based resins and thermoplastic urethane-based resins. The above raw material may be used singly or in combination of two or more. The resin film prepared by using the above raw material may be a single-layered film or a multi-layered film having two or more layers.

Among the above raw materials, the ethylene-vinyl alcohol copolymer-based resin is a preferable raw material since the excellent gas barrier property is exhibited due to a very small amount of permeation of the air. The thermoplastic urethane-based elastomer exhibits excellent water resistance and adhesion to rubber and is preferably used for a layer disposed at the outside in a multi-layered film.

As the ethylene-vinyl alcohol copolymer-based resin described above, a modified ethylene-vinyl alcohol copolymer obtained by bringing an epoxy compound into reaction with an ethylene-vinyl alcohol copolymer is preferable. The modulus of the ethylene-vinyl alcohol copolymer can be decreased remarkably from that of the unmodified copolymer by the above modification, and the probability of fracture and formation of cracks during bending can be decreased.

It is preferable that the ethylene-vinyl alcohol copolymer used for the above modification has a content of the ethylene unit of 25 to 50% by mole. From the standpoint of obtaining the excellent bending resistance and fatigue resistance, it is more preferable that the content of the ethylene unit is 30% by mole or greater and most preferably 35% by more or greater. From the standpoint of the gas barrier property, it is more preferable that the content of the ethylene unit is 48% by mole or smaller and most preferably 45% by mole. When the content of the ethylene unit is smaller than 25% by mole, there is the possibility that the bending resistance and the fatigue resistance become poor and, moreover, there is the possibility that the property for melt molding becomes poor. When the content of the ethylene unit exceeds 50% by mole, the gas barrier property is insufficient, occasionally.

It is preferable that the degree of saponification of the ethylene-vinyl alcohol copolymer is 90% by mole or greater, more preferably 95% by mole or greater, still more preferably 98% by mole or greater and most preferably 99% by mole or greater. When the degree of saponification is smaller than 90% by mole, there is the possibility that the gas barrier property and the heat stability during preparation of a laminate are insufficient.

It is preferable that the melt flow rate (MFR) (at 190° C. under a load of 21.18 N) of the ethylene-vinyl alcohol copolymer used for the modification is 0.1 to 30 g/10 minutes and more preferably 0.3 to 25 g/10 minutes. When the melting point of the ethylene-vinyl alcohol copolymer is around 190° C. or higher than 190° C., the measurement is conducted at a plurality of temperatures higher than the melting point under a load of 21.18 N. The obtained data are placed on a semi-logarithmic graph with the inverse of the absolute temperature as the horizontal axis and the logarithm of MFR as the vertical axis, and the value obtained by extrapolation at 190° C. is used as the desired MFR.

The modification can be conducted by bringing preferably 1 to 50 parts by mass, more preferably 2 to 40 parts by mass and most preferably 5 to 35 parts by mass of an epoxy compound into reaction with 100 parts by mass of the unmodified ethylene-vinyl alcohol copolymer described above. In the reaction, it is advantageous that the reaction is conducted in a solution using a suitable solvent.

In the process of modification in accordance with the solution reaction, the modified ethylene-vinyl alcohol copolymer can be obtained by bringing the epoxy compound into reaction with the ethylene-vinyl alcohol copolymer in a solution in the presence of an acid catalyst or an alkali catalyst. As the solvent, a polar aprotonic solvent which is a good solvent for the ethylene-vinyl alcohol copolymer such as dimethyl sulfoxide, dimethylformamide, dimethylacetamide and N-methylpyrrolidone is preferable. Examples of the catalyst for the reaction include acid catalysts such as p-toluenesulfonic acid, methanesulfonic acid, trifluoromethanesulfonic acid, sulfuric acid and boron trifluoride and alkali catalysts such as sodium hydroxide, potassium hydroxide, lithium hydroxide and sodium methoxide. Among the above catalysts, the acid catalysts are preferable. As the amount of the catalyst, an amount of about 0.0001 to 10 parts by mass per 100 parts by mass of the ethylene-vinyl alcohol copolymer is suitable. The modified ethylene-vinyl alcohol copolymer can also be produced by dissolving the ethylene-vinyl alcohol copolymer and the epoxy compound into a solvent for the reaction, followed by heating the resultant solution.

The epoxy compound used for the modification is not particularly limited. It is preferable that the epoxy compound is a monovalent epoxy compound. When an epoxy compound having a valence of two or greater is used, there is the possibility that crosslinking reaction of the ethylene-vinyl alcohol copolymer takes place to form gel and particles, and the quality of the laminate becomes poor. From the standpoint of the easiness of production, the gas barrier property, the bending resistance and the fatigue resistance of the obtained modified ethylene-vinyl alcohol copolymer, glycidol and epoxypropane are preferable as the monovalent epoxy compound.

The melt flow rate (MFR) (at 190° C. under a load of 21.18 N) of the modified ethylene-vinyl alcohol copolymer used in the present invention is not particularly limited. It is preferable that MFR is 0.1 to 30 g/10 minutes, more preferably 0.3 to 25 g/10 minutes and most preferably 0.5 to 20 g/10 minutes from the standpoint of obtaining the excellent gas barrier property, bending resistance and fatigue resistance. When the melting point of the modified EVOH is around 190° C. or higher than 190° C., the measurement is conducted at a plurality of temperatures higher than the melting point under a load of 21.18 N. The obtained data are placed on a semilogarithmic graph with the inverse of the absolute temperature as the horizontal axis and the logarithm of MFR as the vertical axis, and the value obtained by extrapolation at 190° C. is used as the desired MFR.

It is preferable that the amount of permeation of oxygen through a layer of the film using the modified ethylene-vinyl alcohol as the raw material at 20° C. under 65% RH is $3 \times 10^{-15}$ cm$^3$·cm/cm$^2$·sec·Pa or smaller, more preferably $7 \times 10^{-16}$ cm$^3$·cm/cm$^2$·sec·Pa or smaller and most preferably $3 \times 10^{-16}$ cm$^3$·cm/cm$^2$·sec·Pa or smaller.

The thermoplastic urethane-based elastomer (hereinafter, referred to as TPU, occasionally) described above constituting layer (A) in the pneumatic tire of the present invention is an elastomer having urethane group (—NH—COO—) in the molecule and formed by the reaction between molecules of three components, i.e., (1) a polyol (a long chain diol), (2) a diisocyanate and (3) a short chain diol. The polyol and the short chain diol form a linear polyurethane by the addition reaction with the diisocyanate. Among these components, the polyol forms the flexible portion (the soft segment) of the elastomer, and the diisocyanate and the diol form the hard portion (the hard segment). The properties of TPU vary depending on the properties of the raw materials, the conditions of the polymerization and the relative amounts of the raw materials. Among these factors, the type of the polyol exhibits a great influence on the properties of TPU. Many of the basic properties are decided by the type of the long chain diol, and the hardness is adjusted by the relative amount of the hard segment.

Examples of the type of the long chain diol include (i) the caprolactone type (a polylactone ester polyol obtained by the ring-opening of caprolactone), (ii) the adipic acid type (=the adipate type)<an adipic acid ester polyol obtained from adipic acid and glycol> and (iii) PTMG (polytetramethylene glycol) type (=the ether type)<polytetramethylene glycol obtained by the ring-opening polymerization of tetrahydrofuran>.

In the present invention, the process for forming the resin film constituting layer (A) is not particularly limited. When a single-layered film is prepared, a conventional process such as the solution casting process, the melt extrusion process and the calendering process can be used. Among these processes, the melt extrusion process such as the T-die process and the inflation process is preferable. When a multi-layered film is prepared, the laminate process using coextrusion is preferable.

It is preferable that the thickness of the layer of the resin film of layer (A) is 200 μm or smaller from the standpoint of decreasing the thickness of the laminate comprising the film of the thermoplastic resin when the laminate is used as the inner liner. When the thickness is excessively small, there is the possibility that the effect of laminating layer (A) with layer (B) is not sufficiently exhibited. Therefore, the lower limit of the thickness of layer (A) is about 1 μm. It is more preferable that the thickness of layer (A) is in the range of 10 to 150 μm and most preferably in the range of 20 to 100 μm.

In the present invention, as the layer of the resin film of layer (A), a layer comprising a layer of the thermoplastic urethane-based elastomer is preferable, and a layer which consists of a multi-layered film comprising at least one layer of the modified ethylene-vinyl alcohol copolymer described above in combination with the layer of the thermoplastic urethane-based elastomer is more preferable.

Examples of the multi-layered film include a multi-layered film having a three-layered structure in which a film of the thermoplastic urethane-based elastomer is laminated to both faces of the film of the modified ethylene-vinyl alcohol copolymer.

Where necessary, to improve adhesion with an adhesive layer disposed on the resin film constituting layer (A), the resin film constituting layer (A) may be subjected to a surface treatment such as the oxidation process and the roughening process at least on the face at the side where the adhesive layer is laminated. Examples of the oxidation process include the treatment by corona discharge, the treatment by plasma discharge, the treatment with chromic acid (a wet process), the treatment with flame, the treatment with the heated air and the treatment with ozone and irradiation of ultraviolet light. Examples of the roughening process include the treatment by sand blasting and the treatment with a solvent. The surface treatment can be suitably selected in accordance with the type of the substrate film. In general, the treatment by corona discharge is preferable from the standpoint of the effect and the operability.

In the pneumatic tire of the present invention, preferable examples of the rubbery elastomer constituting layer (B) include butyl rubber and diene-based rubbers. Examples of the diene-based rubber include natural rubber, isoprene synthetic rubber (IR), cis-1,4-polybutadiene (BR), syndiotactic 1,2-polybutadiene (1,2-BR), styrene-butadiene rubber (SBR), acrylonitrile-butadiene rubber (NBR) and chloroprene rubber (CR). Among these rubbers, natural rubber and butadiene rubber are preferable.

From the standpoint of the gas barrier property, it is preferable that butyl rubber is used as the rubbery elastomer. As the butyl-based rubber described above, butyl rubber and/or a halogenated butyl rubber can be used. Among the butyl-based rubbers described above, the halogenated butyl rubber is preferable since the vulcanization rate is great and the heat resistance, the adhesive property and the compatibility with other unsaturated rubbers are excellent. Examples of the halogenated butyl rubber include chlorinated butyl rubber, brominated butyl rubber and other modified rubbers. Examples of the commercially available halogenated butyl rubber include "ENJAY BUTYL HT10-66" (manufactured by ENJAY CHEMICAL Company; a trade name) as the chlorinated butyl rubber and "BROMOBUTYL 2255" (manufactured by EXXON Company; a trade name) as the brominated butyl rubber. As the modified rubber, chlorinated or brominated modified copolymers derived from copolymers of an isomonoolefin and para-methylstyrene can be used, and this modified copolymer is available, for example, as "EXPRO 50" (manufactured by EXXON Company; a trade name).

From the standpoint of suppressing growth of cracks after the cracks are formed in the layer of a rubbery elastomer, it is preferable that a composition comprising butyl rubber and a diene-based rubber is used as the rubbery elastomer. It is preferable that the content of the butyl-based rubber in the rubber component of the rubbery elastomer is 70 to 100% by mass from the standpoint of the resistance to permeation of the air. The rubber component may comprise the diene-based rubber in a relative amount of 0 to 50% by mass and preferably 0 to 30% by mass. When the above composition is used as the rubbery elastomer, permeation of the air can be excellently suppressed even when minutes cracks are formed in the layer of the rubbery elastomer.

The rubbery elastomer described above may comprise inorganic fillers in combination with the rubber component described above so that the resistance to permeation of the air, the crack resistance at low temperatures and the bending fatigue resistance are improved. As the inorganic filler, inorganic filler having a lamellar shape or a plate shape are preferable. Examples of the above inorganic filler include kaolin, clay, mica, feldspar, silica and composite materials of alumina containing water. The content of the inorganic filler is, in general, in the range of about 10 to 180 parts by mass and preferably in the range of 20 to 120 parts by mass per 100 parts by mass of the rubber component.

The rubber component may comprise carbon black in an amount of 0 to 50 parts by mass and preferably 10 to 50 parts by mass per 100 parts by mass of the rubber component so that the strength of the unvulcanized rubber is increased.

The type of the carbon black is not particularly limited, and a carbon black can be suitably selected from carbon blacks conventionally used as the reinforcing filler for rubbers as desired. Examples of the carbon black include FEF, SRF, HAF, ISAF, SAF and GPF.

In the present invention, it is preferable that the sum of the contents of the inorganic filler described above and the carbon black is in the range of 30 to 200 parts by mass and more preferably in the range of 50 to 140 parts by mass per 100 parts by mass of the rubber component from the standpoint of the resistance to permeation of the air, the bending fatigue resistance, the crack resistance at low temperatures and the workability.

The rubbery elastomer may further comprise 0 to 5 parts by mass of a dispersion improver per 100 parts by mass of the rubber component so that dispersion of the inorganic fillers and the carbon black in the rubber component is improved and the desired physical properties are improved. Examples of the dispersion improver include silane coupling agents, dimethylstearylamine and triethanolamine. The dispersion improver may be used singly or in combination of two or more.

In the rubbery elastomer, when the carbon black described above is used, it is preferable that a naphthenic oil or a paraffinic oil is used in an amount of 1 part by mass or greater and more preferably 3 to 20 parts by mass per 100 parts by mass of the rubber component. As the naphthenic oil, naphthenic oils having a value of % $C_N$ of 30 or greater in accordance with the ring analysis are preferable. As the paraffinic oil, paraffinic oils having a value of % $C_P$ of 60 or greater are preferable.

The rubbery elastomer may comprise organic short fibers, where desired. When the rubbery elastomer comprises organic short fibers, exposure of the cord at the inner face, which arise occasionally when a tire having a decreased thickness of the inner liner is produced, can be suppressed. It is preferable that the organic short fiber has an average diameter of about 1 to 100 μm and an average length of about 0.1 to 0.5 mm. The organic short fiber may be used as FRR (a composite material of short fibers and an unvulcanized rubber).

It is preferable that the content of the organic short fibers is 0.3 to 15 parts by mass per 100 parts by mass of the rubber component. The material of the organic short fiber is not particularly limited. Examples of the material of the organic short fiber include polyamides such as nylon-6 and nylon-66, syndiotactic 1,2-polybutadiene, isotactic polypropylene and polyethylene. Among these materials, polyamides are preferable.

An adhesion improver for improving adhesion between the rubber and the fiber such as hexamethylenetetramine and resorcinol may be further added to increase the modulus of the rubber comprising the organic short fibers.

The rubbery elastomer described above may further comprise various chemicals conventionally used in the rubber industry such as vulcanizing agents, vulcanization accelerators, antioxidants, antiscorching agents, zinc oxide and stearic acid in combination with the ingredients described above as long as the object of the present invention is not adversely affected.

In the laminate in the present invention, the rubbery elastomer constituting layer (B) can be obtained by extruding a rubber composition comprising the components described above in accordance with a conventional process to obtain a film or a sheet while the rubber composition is in the uncured condition.

The thickness of the layer of the rubbery elastomer of layer (B) in the laminate in the present invention is, in general, 20 μm or greater. The upper limit of the thickness of layer (B) is decided depending on the size of the tire with consideration on decreasing the thickness when the layer is used for the inner liner.

When the laminate used in the present invention comprising the rubbery elastic layer of layer (B) is applied to the inner liner of the tire, the bending resistance and the fatigue resistance are improved and fracture and formation of cracks due to the bending deformation during rotation of the tire are suppressed since the layer of the resin film of layer (A) having a thickness as small as 200 μm or smaller is used. Even when fracture takes place, formation of a great fracture or marked growth of cracks is suppressed since adhesion of the layer of the resin film of layer (A) with the rubbery elastic layer of layer (B) via an adhesive layer of layer (C), which will be described below, is very excellent and separation is suppressed. Even when formation of a great fracture or marked growth of cracks takes place, the internal pressure can be maintained excellently since the gas barrier property in the portion of the fracture or the cracks formed in the layer of the resin film of layer (A) can be maintained with the rubbery elastic layer of layer (B).

In the present invention, it is preferable that the surface of the layer of a single-layered or multi-layered film of a thermoplastic resin of layer (A) and the rubbery elastic layer of layer (B) are adhered to each other with an adhesive composition of component (D) constituting an adhesive layer of layer (C) which is disposed between layer (A) and layer (B) from the standpoint of the average peel strength. As the adhesive composition of component (D) constituting the adhesive layer of layer (C), a composition comprising (a) a rubber component and (b) at least one compound selected from poly-p-dinitrosobenzene and 1,4-phenylene-dimaleimide as the crosslinking and auxiliary crosslinking agent in an amount of 0.1 part by mass or greater per 100 parts by mass of the rubber component is used.

In the adhesive composition, the rubber component of component (a) is not particularly limited and is suitably selected in accordance with the types and the compositions of the layer of the resin film of layer (A) and the rubbery elastic layer of layer (B) so that the excellent tackiness and the excellent average peel strength can be surely obtained. In general, it is preferable that 50% by mass or greater of butyl rubber and/or a halogenated butyl rubber or a diene-based rubber is used.

Examples of the butyl rubber, the halogenated butyl rubber and the diene-based rubber include the rubbers described as the examples of the rubbery elastomer constituting layer (B).

It is preferable that component (a) comprises 70 to 100% by mass of the halogenated butyl rubber from the standpoint of the workability and the average peel strength of the adhesive layer.

It is preferable that component (a) comprises 10% by mass or greater of chlorosulfonated polyethylene, where desired. Chloro-sulfonated polyethylene (hereinafter, referred to as CSM, occasionally) is a synthetic rubber prepared by chlorination and chlorosulfonation of polyethylene with chlorine and sulfurous oxide gas and has a saturated structure having no double bonds. CSM exhibits excellent stability with excellent weatherability, ozone resistance and heat resistance. CSM is commercially available from DU PONT Company in the trade name of "HYPALON". From the standpoint of improving the average peel strength and the heat resistance, it is preferable that component (a) comprises 10 to 40% by mass of CSM.

In the present invention, from the standpoint of the average peel strength, it is preferable that component (a) comprises 70% by mass or greater of the halogenated butyl rubber, 10% by mass or greater of chlorosulfonated polyethylene and 5% by mass or greater of natural rubber and/or isoprene rubber.

It is preferable that the adhesive composition comprises 0.1 part by mass or greater of at least one compound selected from poly-p-dinitroso-benzene and 1,4-phenylenedimaleimide as the crosslinking and auxiliary crosslinking agent of component (b) so that the average peel strength after the heat treatment is improved.

Poly-p-dinitrosobenzene is an effective crosslinking agent for a rubber having a limited amount of the double bond such as halogenated butyl rubber. When the heat treatment is conducted after adding poly-p-dinitrosobenzene, cold flow of the unvulcanized composition is prevented, and the extrusion property of the unvulcanized composition and the physical properties of the vulcanized composition can be improved. The plasticity can also be adjusted.

When vulcanization is conducted using 1,4-phenylenedimaleimide, the carbon-carbon covalent bond is formed, and the heat resistance and the antioxidation property are improved. In particular, 1,4-phenylene-dimaleimide works as an effective crosslinking agent also for chlorosulfonated polyethylene rubber.

It is preferable that the amount of component (b) in the adhesive composition is 0.1 part by mass or greater per 100 parts by mass of the rubber component in the adhesive composition.

As the filler of component (c) in the adhesive composition, inorganic fillers and/or carbon black can be used. Examples of the inorganic filler include silica prepared in accordance with the wet process (hereinafter, referred to as wet silica), aluminum hydroxide, aluminum oxide, magnesium oxide, montmorillonite, mica, smectite, montmorillonite modified with organic substances, mica modified with organic substances and smectite modified with organic substances. The inorganic filler may be used singly or in combination of two or more.

Examples of carbon black include carbon blacks described as the examples of carbon black for the rubbery elastomer constituting layer (B).

The content of the filler of component (c) in the adhesive composition is selected in the range of 2 to 50 parts by mass and preferably in the range of 5 to 35 parts by mass per 100 parts by mass of the rubber component of component (a) from the standpoint of the tackiness and the average peel strength.

Examples of the commercially available adhesive composition comprising the components of the adhesive composition described above, i.e., chlorosulfonated polyethylene as the rubber component of component (a), the crosslinking and auxiliary crosslinking agent of component (b) and the filler of component (c), include CHEMLOCK 6250 (manufactured by LORD Corporation). CHEMLOCK 6250 can be used as a mixture comprising components (a), (b) and (c) of the adhesive composition.

The obtained laminate can exhibit the desired average peel strength when the adhesive composition described above comprises 0.1 part by mass or greater of a vulcanization accelerator per 100 parts by mass of the rubber composition as component (d). The vulcanization accelerator is not particularly limited. For example, at least one vulcanization accelerator selected from thiuram-based vulcanization accelerators, substituted dithiocarbamate-based vulcanization accelerators, guanidine-based vulcanization accelerators, thiazole-based vulcanization accelerators, sulfenamide-based vulcanization accelerators, thiourea-based vulcanization accelerators and xanthate-based vulcanization accelerators can be used. Among these vulcanization accelerators, thiuram-based vulcanization accelerators and/or substituted dithiocarbamate-based vulcanization accelerators are preferable. The upper limit of the content of the vulcanization accelerator is not set strictly and is, in general, about 5 parts by mass. It is preferable that the content of the vulcanization accelerator is in the range of 0.3 to 3 parts by mass.

When the adhesive composition comprises 0.1 part by mass or greater of the thiuram-based vulcanization accelerator and/or the substituted dithiocarbamate-based vulcanization accelerator, the obtained laminate can exhibit the desired average peel strength. The upper limit of the content of the vulcanization accelerator is not set strictly and is, in general, about 5 parts by mass. It is preferable that the content of the vulcanization accelerator is in the range of 0.3 to 3 parts by mass.

Examples of the thiuram-based vulcanization accelerator include tetramethylthiuram monosulfide, tetramethylthiuram disulfide, activated tetramethylthiuram disulfide, tetraethylthiuram disulfide, tetrabutyl-thiuram monosulfide, tetrabutylthiuram disulfide, dipentamethylene-thiuram tetrasulfide, dipentamethylenethiuram hexasulfide, tetrabenzylthiuram disulfide and tetrakis(2-ethylhexyl)thiuram disulfide.

Examples of the substituted dithiocarbamate-based vulcanization accelerator include sodium dimethyldithiocarbamate, sodium diethyldithiocarbamate, sodium di-n-butyldithiocarbamate, potassium dimethyldithiocarbamate, lead ethylphenyldithiocarbamate, zinc dimethyldithiocarbamate, zinc diethyldithiocarbamate, zinc di-n-butyl-dithiocarbamate, zinc dibenzyldithiocarbamate, zinc N-pentamethylene-dithiocarbamate, zinc ethylphenyldithiocarbamate, tellurium diethyldithiocarbamate, copper dimethyldithiocarbamate and piperidine pentamethylenedithiocarbamate.

In the present invention, at least one vulcanization accelerator selected from the thiuram-based vulcanization accelerators and the substituted dithiocarbamate-based vulcanization accelerators is used. Among these vulcanization accelerators, the substituted dithio-carbamate-based vulcanization accelerators are preferable, and zinc dibenzyldithiocarbamate is more preferable.

In the adhesive composition, a resin and/or a low molecular weight polymer is used as component (e) for improving workability in the building process (improving tackiness of the adhesive composition).

Examples of the resin of component (d) include phenol-based resins, modified terpene-based resins, terpene-based resins, hydrogenated terpene-based resins, rosin-based resins, $C_5$- and $C_9$-petroleum resins, xylene resins, coumarone-indene resins, dicyclopentadiene resins and styrene resins. Among these resins, $C_5$-fraction resins, phenol-based resins, terpene-based resins, modified terpene-based resins, hydrogenated terpene-based resins and rosin-based resins are preferable.

Examples of the $C_5$-fraction resin include petroleum resins obtained, in general, by polymerization or copolymerization of olefin-based hydrocarbons such as 1-pentene, 2-pentene, 2-methyl-1-butene, 2-methyl-2-butene and 3-methyl-1-butene and diolefin-based hydrocarbons such as 2-methyl-1,3-butadiene, 1,2-pentadiene, 1,3-pentadiene and 3-methyl-1,2-butadiene, which are obtained by cracking of naphtha.

Examples of the phenol-based resin include resins obtained by condensation of p-t-butylphenol and acetylene in the presence of a catalyst and resins obtained by condensation of an alkylphenol and formaldehyde.

Examples of the terpene-based resin, the modified terpene-based resin and the hydrogenated terpene-based resin include terpene-based resins such as β-pinene resins and α-pinene resins, hydrogenated terpene-based resin obtained by hydrogenation of the above terpene-based resins, and modified terpene-based resins obtained by the reaction of terpene and phenol in the presence of a Friedel-Crafts type catalyst or by condensation of terpene with formaldehyde.

Examples of the rosin-based resin include rosin of the natural resin and rosin derivatives obtained by modifying the rosin of the natural resin by hydrogenation, disproportionation, dimerization or esterification or with lime. The above resins may be used singly. Among the above resins, phenol-based resins are preferable.

As for the low molecular weight polymer, it is preferable that the polymer has a weight-average molecular weight in the range of 1,000 to 100,00 and more preferably in the range of 1,000 to 50,000, as expressed by the weight-average molecular weight of the corresponding polystyrene. It is preferable that the polymer has the double bond in the molecule. It is more preferable that the polymer has the styrene unit in combination with the double bond. Examples of the low molecular weight polymer include styrene-butadiene copolymers.

The low molecular weight styrene-butadiene copolymer can be prepared, for example, by copolymerizing butadiene and styrene in a hydrocarbon solvent such as cyclohexane using an initiator of an organolithium compound in the presence of an ether or a tertiary-amine at about 50 to 90° C. The molecular weight of the obtained copolymer can be controlled by the amount of the organolithium compound, and the microstructure can be controlled by the amount of the ether or the tertiary-amine.

In the present invention, the low molecular weight polymer may be used singly or in combination of two or more as component (e). A combination of one or more resins described above and one or more low molecular weight polymers described above may be used.

In the present invention, it is preferable that component (e) is used in an amount of 5 parts by mass or greater, more preferably 5 to 40 parts by mass and most preferably 10 to 30 parts by mass per 100 parts by mass of the rubber component of component (a).

In particular, it is preferable that the phenol-based resins is used as component (e) since the obtained adhesive composition exhibits the excellent tackiness.

Where desired, the adhesive composition may comprise vulcanizing agents, stearic acid, zinc oxide, antioxidants and the like agents as long as the object of the present invention is not adversely affected.

The process for producing the laminate used in the present invention will be described in the following.

In the first step, the components described above constituting the adhesive composition of component (D) are added to an organic solvent and dissolved or dispersed in the organic solvent, and a coating fluid comprising the adhesive composition and the organic solvent is prepared.

In the preparation, it is preferable that an organic solvent having a value of the Hildebrand solubility parameter δ of 14 to 20 $MPa^{1/2}$, i.e., a good solvent for the rubber component of component (a), is used. Examples of the organic solvent include toluene, xylene, n-hexane, cyclohexane, chloroform and methyl ethyl ketone. The organic solvent may be used singly or as a mixture of two or more.

The concentration of the solid components in the coating fluid prepared as described above is suitably selected with consideration on the property for coating and the property for handling and is, in general, in the range of 5 to 50% by mass and preferably in the range of 10 to 30% by mass.

The coating fluid prepared as described above is applied to the surface of the resin film constituting layer (A) and dried. The film or sheet of the rubbery elastomer constituting layer (B) is laminated on obtained coating film. The resultant laminate is treated by heating for vulcanization, and the laminate advantageously used in the present invention can be obtained.

As another process, the coating fluid described above is applied to the surface of the film or the sheet of the rubbery elastomer constituting layer (B) and dried. The resin film constituting layer (A) is laminated on the obtained coating film. The resultant laminate is treated by heating for vulcanization, and the laminate used in the present invention can be obtained.

Among the two processes described above, in general, the first process is used.

In the processes described above, when the resin film constituting layer (A) comprises a layer of the modified ethylene-vinyl alcohol copolymer, it is preferable that the layer of the modified ethylene-vinyl alcohol copolymer is crosslinked by irradiating the resin film with an energy ray in advance before the resin film and the film or the sheet of the rubbery elastomer are laminated to each other via the layer of the adhesive composition. When the operation for the crosslinking is not conducted, the layer of the modified ethylene-vinyl alcohol copolymer is greatly deformed in the step of vulcanization by heating conducted in a later step, and there is the possibility that the obtained laminate does not exhibit the expected function as the inner liner for tires.

Examples of the energy ray include ionizing radiations such as ultraviolet light, electron beam, X-ray, α-ray and γ-ray. Among the ionizing radiations, electron beam is preferable.

In the process for irradiation with electron beam, the resin film is introduced into an apparatus for irradiation with electron beam, and electron beam is applied. The amount of the electron beam is not particularly limited. It is preferable that the amount of the electron beam is in the range of 10 to 60 Mrad. When the amount of the electron beam used for the irradiation is smaller than 10 Mrad, the crosslinking is suppressed. When the amount of the electron beam used for the irradiation exceeds 60 Mrad, degradation of the resin film tends to proceed. It is more preferable that the amount of the electron beam is in the range of 20 to 50 Mrad.

The vulcanization by heating is conducted, in general, at a temperature of 100° C. or higher, preferably in the range of 125 to 200° C. and more preferably in the range of 130 to 180° C. In the case of the pneumatic tire of the present invention, the vulcanization by heating is conducted at the time when the entire tire is vulcanized by heating.

The inner liner layer used in the pneumatic tire of the present invention is characterized by the excellent tackiness and the excellent average peel strength.

FIG. 1 shows a partial sectional view exhibiting an embodiment of the pneumatic tire using the inner liner layer described in the present invention. The tire comprises a carcass layer 2 which comprises a carcass ply which is wound around bead cores 1 and has cords disposed in the radial direction of the tire, an inner liner layer 3 which is disposed at the inside of the carcass layer in the radial direction of the tire and comprises the laminate having the adhesive layer 14 described in the present invention, a belt portion which is disposed at the outside of the crown portion of the carcass layer in the radial direction of the tire and has two belt layers 4, a tread portion 5 which is disposed at the upper side of the belt portion and side wall portions 6 disposed at the right and left sides of the tread portion.

Figure 2:
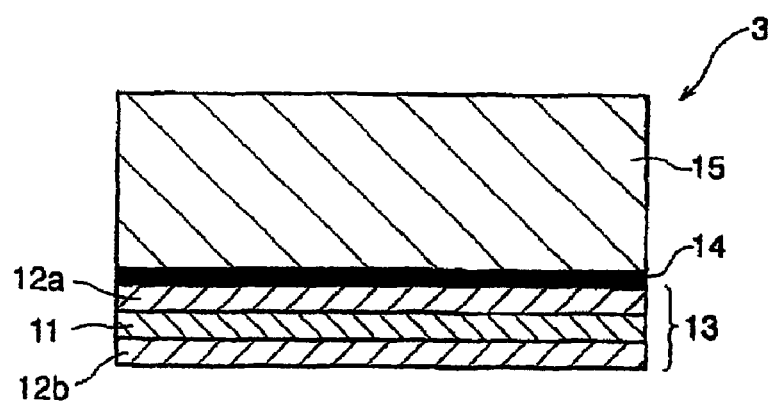
FIG. 2 shows an enlarged sectional view exhibiting an embodiment of the construction of the laminate described in the present invention.

FIG. 2 shows an enlarged sectional view exhibiting an embodiment of the inner liner layer described in the present invention in the pneumatic tire shown above. The inner liner layer 3 has a structure such that a layer of the resin film 13 comprising a layer of the modified ethylene-vinyl alcohol copolymer 11 and layers of the thermoplastic urethane-based elastomer 12a and 12b laminated to both faces of the layer of the copolymer 11 and a layer of the rubbery elastomer 15 are integrally adhered to each other via an adhesive layer 14. The layer of the rubbery elastomer 15 is adhered to the carcass layer 2 in FIG. 1 on the face opposite to the face having the adhesive layer 14.

EXAMPLES

The present invention will be described more specifically with reference to examples in the following. However, the present invention is not limited to the examples.

Preparation Example 1 Preparation of a Modified Ethylene-Vinyl Alcohol Copolymer Into a pressure-resistant reactor, 2 parts by mass of an ethylene-vinyl alcohol copolymer having a content of ethylene of 44% by mole and a degree of saponification of 99.9% by mole (MFR: 5.5 g/10 minutes at 190° C. under a load of 21.1 N) and 8 parts by mass of N-methyl-2-pyrrolidone were placed, and the ethylene-vinyl alcohol copolymer was completely dissolved by stirring under heating at 120° C. for 2 hours. To the obtained solution, 0.4 parts by mass of epoxypropane as the epoxy compound was added, and the resultant mixture was heated at 160° C. for 4 hours. After the heating was completed, the reaction product was separated as precipitates by adding the reaction mixture into 100 parts by mass of distilled water and washed with a great amount of distilled water to sufficiently remove N-methyl-2-pyrrolidone and the unreacted epoxypropane, and a modified ethylene-vinyl alcohol copolymer was obtained. The obtained modified ethylene-vinyl alcohol copolymer was pulverized by a pulverizer into particles having diameters of about 2 mm and, then, sufficiently washed with a great amount of distilled water. After the washed particles were dried in vacuo at the room temperature for 8 hours, the particles were melt extruded at 200° C. by a twin-screw extruder, and pellets of the copolymer was obtained.

The content of ethylene and the degree of saponification of the ethylene-vinyl alcohol copolymer were values calculated based on a spectrum obtained by the measurement of $^1$H-NMR [using an apparatus of the JIM-GX-500 type, manufactured by NIPPON DENSHI Co., Ltd.] using deuterated dimethyl sulfoxide as the solvent. For the measurement of the melt flow rate (MFR) of the ethylene-vinyl alcohol copolymer, a sample was packed into a cylinder having an inner diameter of 9.55 mm and a length of 162 mm of MELT INDEXER L224 [manufactured by TAKARA KOGYO Co., Ltd.] and melted at 190° C. A load was applied uniformly to the melted sample using a plunger having a weight of 2,160 g and a diameter of 9.48 mm, and the copolymer was extruded from an orifice having a diameter of 2.1 mm formed at the center of the cylinder. MFR was obtained from the amount of the extruded resin per unit time (g/10 minutes). When the melting point of the ethylene-vinyl alcohol copolymer is around 190° C. or higher than 190° C., the measurement is conducted at a plurality of temperatures higher than the melting point under a load of 2,160 g. The obtained data are placed on a semi-logarithmic graph with the inverse of the absolute temperature as the horizontal axis and the logarithm of MFR as the vertical axis, and the value obtained by extrapolation at 190° C. was used as the desired melt flow rate (MFR).

Preparation Example 2 Preparation of a Three-Layered Film

Using the modified EVOH obtained in Preparation Example 1 and a thermoplastic polyurethane (manufactured by KURARAY Co., Ltd.; KURAMIRON 3190) as the elastomer, a three-layered film (a layer of the thermoplastic polyurethane/a layer of the modified EVOH/a layer of the thermoplastic polyurethane) was prepared by coextrusion under the following condition of molding using an apparatus for extruding two types of materials to form three layers. The layer of the modified EVOH and the layers of the thermoplastic polyurethane had the same thickness of 20 μm.

Condition of molding by extrusion was as follows:
Construction of layers:
a layer of the thermoplastic polyurethane/a layer of the modified EVOH/a layer of the thermoplastic polyurethane (the thickness: 20/20/20, the unit: μm)
Temperature of extrusion of the resins
C1/C2/C3/die=170/170/220/220° C.
Type of the extruder for the resins
thermoplastic polyurethane:
25 mmφ extruder, P25-18AC (manufactured by OSAKA SEIKI KOSAKU Co., Ltd.)

modified EVOH
  20 mmφ extruder, a laboratory machine of the ME type, CO-EXT (manufactured by TOYO SEIKI Co., Ltd.)
  T-die
  a T-die for 2 types of materials to form 3 layers, a width of 500 mm (manufactured by PLASTIC KOGAKU KENKYUSHO Co., Ltd.)
  Temperature of a cooling roll: 50° C.
  Speed of winding: 4 m/minute Preparation Example 3 Preparation of a Layer of an Unvulcanized Rubbery Elastomer A rubber composition was prepared in accordance with the following formulation, and a sheet of an unvulcanized rubbery elastomer having a thickness of 500 μm was prepared.

| Rubber composition (the unit for the components: part by mass) | |
|---|---|
| natural rubber | 30 |
| Br-IIR (manufactured by JSR Co., Ltd.; BROMOBUTYL 2244) | 70 |
| GPF carbon black (manufactured by ASAHI CARBON Co., Ltd.; #55) | 60 |
| SUNPAR 2280 (manufactured by NIPPON SUN SEKIYU Co., Ltd.) | 7 |
| stearic acid (manufactured by ASAHI DENKA KOGYO Co., Ltd.) | 1 |
| vulcanization accelerator (manufactured by OUCHI SHINKO KAGAKU KOGYO Co., Ltd.; NOCCELOR DM) | 1.3 |
| zinc oxide (manufactured by HAKUSUI KAGAKU KOGYO Co., Ltd.) | 3 |
| sulfur (manufactured by KARUIZAWA SEIRENSHO Co., Ltd.) | 0.5 |

Preparation Example 4 Preparation of Adhesive Composition-1 and a Coating Fluid

| Adhesive composition (the unit for the components: part by mass) | |
|---|---|
| Br-IIR (manufactured by JSR Co., Ltd.; BROMOBUTYL 2244) | 90 |
| chlorosulfonated polyethylene (manufactured by DU PONT PERFORMANCE ELASTOMERS Company; HYPALON) | 10 |
| carbon black (manufactured by TOKAI CARBON Co., Ltd.; SIEST NB) | 10 |
| phenol resin (manufactured by SUMITOMO BAKELITE Co., Ltd.; PR-SC-400) | 20 |
| stearic acid (manufactured by SHIN NIPPON RIKA Co., Ltd.; 50S) | 1 |
| zinc oxide (manufactured by HAKUSUI KAGAKU KOGYO Co., Ltd.; HAKUSUITECH) | 3 |
| p-dinitrosobenzene (manufactured by OUCHI SHINKO KAGAKU KOGYO Co., Ltd.; VULNOC DNB) | 3 |
| 1,4-phenylenedimaleimide (manufactured by OUCHI SHINKO KAGAKU KOGYO Co., Ltd.; VULNOC PM) | 3 |
| vulcanization accelerator (manufactured by OUCHI SHINKO KAGAKU KOGYO Co., Ltd.; NOCCELOR ZTC) | 1 |
| vulcanization accelerator (manufactured by OUCHI SHINKO KAGAKU KOGYO Co., Ltd.; NOCCELOR DM) | 0.5 |
| vulcanization accelerator (manufactured by OUCHI SHINKO KAGAKU KOGYO Co., Ltd.; NOCCELOR D) | 1 |
| sulfur (manufactured by TSURUMI KAGAKU Co., Ltd.; KINKA-mark fine powder sulfur) | 1.5 |

A composition prepared in accordance with the above formulation was mixed in accordance with a conventional process. The prepared adhesive composition was added to 1,000 parts by mass of toluene (the δ-value: 18.2 MPa$^{1/2}$) as the organic solvent. The adhesive composition was dissolved or dispersed in the organic solvent, and an adhesive coating fluid was prepared.

Preparation Example 5 Preparation of Adhesive Composition-2 and a Coating Fluid

| Adhesive composition (the unit for the components: part by mass) | |
|---|---|
| Br-IIR (manufactured by JSR Co., Ltd.; BROMOBUTYL 2244) | 80 |
| chlorosulfonated polyethylene (manufactured by DU PONT PERFORMANCE ELASTOMERS Company; HYPALON) | 20 |
| carbon black (manufactured by TOKAI CARBON Co., Ltd.; SIEST NB) | 9 |
| phenol resin (manufactured by SUMITOMO BAKELITE Co., Ltd.; PR-SC-400) | 18 |
| stearic acid (manufactured by SHIN NIPPON RIKA Co., Ltd.; 50S) | 1 |
| zinc oxide (manufactured by HAKUSUI KAGAKU KOGYO Co., Ltd.; HAKUSUITECH) | 6 |
| p-dinitrosobenzene (manufactured by OUCHI SHINKO KAGAKU KOGYO Co., Ltd.; VULNOC DNB) | 6 |
| 1,4-phenylenedimaleimide (manufactured by OUCHI SHINKO KAGAKU KOGYO Co., Ltd.; VULNOC PM) | 6 |
| vulcanization accelerator (manufactured by OUCHI SHINKO KAGAKU KOGYO Co., Ltd.; NOCCELOR ZTC) | 1 |
| vulcanization accelerator (manufactured by OUCHI SHINKO KAGAKU KOGYO Co., Ltd.; NOCCELOR DM) | 0.5 |
| vulcanization accelerator (manufactured by OUCHI SHINKO KAGAKU KOGYO Co., Ltd.; NOCCELOR D) | 1 |
| sulfur (manufactured by TSURUMI KAGAKU Co., Ltd.; KINKA-mark fine powder sulfur | 1.5 |

A composition prepared in accordance with the above formulation was mixed in accordance with a conventional process. The prepared adhesive composition was added to 1,000 parts by mass of toluene (the δ-value: 18.2 MPa$^{12}$) as the organic solvent. The adhesive composition was dissolved or dispersed in the organic solvent, and an adhesive coating fluid was prepared.

Preparation Example 6 Preparation of Adhesive Composition-3 and a Coating Fluid

| Adhesive composition (the unit for the components: part by mass) | |
|---|---|
| Br-IIR (manufactured by JSR Co., Ltd.; BROMOBUTYL 2244) | 93 |
| chlorosulfonated polyethylene (manufactured by DU PONT PERFORMANCE ELASTOMERS Company; HYPALON) | 7 |
| carbon black (manufactured by TOKAI CARBON Co., Ltd.; SIEST NB) | 10 |
| phenol resin (manufactured by SUMITOMO BAKELITE Co., Ltd.; PR-SC-400) | 20 |
| stearic acid (manufactured by SHIN NIPPON RIKA Co., Ltd.; 50S) | 1 |
| zinc oxide (manufactured by HAKUSUI KAGAKU KOGYO Co., Ltd.; HAKUSUITECH) | 2 |
| p-dinitrosobenzene (manufactured by OUCHI SHINKO KAGAKU KOGYO Co., Ltd.; VULNOC DNB) | 2 |

| Adhesive composition (the unit for the components: part by mass) | |
| --- | --- |
| 1,4-phenylenedimaleimide (manufactured by OUCHI SHINKO KAGAKU KOGYO Co., Ltd.; VULNOC PM) | 2 |
| vulcanization accelerator (manufactured by OUCHI SHINKO KAGAKU KOGYO Co., Ltd.; NOCCELOR ZTC) | 1 |
| vulcanization accelerator (manufactured by OUCHI SHINKO KAGAKU KOGYO Co., Ltd.; NOCCELOR DM) | 0.5 |
| vulcanization accelerator (manufactured by OUCHI SHINKO KAGAKU KOGYO Co., Ltd.; NOCCELOR D) | 1 |
| sulfur (manufactured by TSURUMI KAGAKU Co., Ltd.; KINKA-mark fine powder sulfur | 1.5 |

A composition prepared in accordance with the above formulation was mixed in accordance with a conventional process. The prepared adhesive composition was added to 1,000 parts by mass of toluene (the δ-value: 18.2 MPa$^{1/2}$) as the organic solvent. The adhesive composition was dissolved or dispersed in the organic solvent, and an adhesive coating fluid was prepared.

Preparation Example 7 Preparation of Adhesive Composition-4 and a Coating Fluid

| Adhesive composition (the unit for the components: part by mass) | |
| --- | --- |
| Br-IIR (manufactured by JSR Co., Ltd.; BROMOBUTYL 2244) | 83 |
| chlorosulfonated polyethylene (manufactured by DU PONT PERFORMANCE ELASTOMERS Company; HYPALON) | 17 |
| carbon black (manufactured by TOKAI CARBON Co., Ltd.; SIEST NB) | 10 |
| phenol resin (manufactured by SUMITOMO BAKELITE Co., Ltd.; PR-SC-400) | 20 |
| stearic acid (manufactured by SHIN NIPPON RIKA Co., Ltd.; 50S) | 1 |
| zinc oxide (manufactured by HAKUSUI KAGAKU KOGYO Co., Ltd.; HAKUSUITECH) | 5 |
| p-dinitrosobenzene (manufactured by OUCHI SHINKO KAGAKU KOGYO Co., Ltd.; VULNOC DNB) | 5 |
| 1,4-phenylenedimaleimide (manufactured by OUCHI SHINKO KAGAKU KOGYO Co., Ltd.; VULNOC PM) | 5 |
| vulcanization accelerator (manufactured by OUCHI SHINKO KAGAKU KOGYO Co., Ltd.; NOCCELOR ZTC) | 1 |
| vulcanization accelerator (manufactured by OUCHI SHINKO KAGAKU KOGYO Co., Ltd.; NOCCELOR DM) | 0.5 |
| vulcanization accelerator (manufactured by OUCHI SHINKO KAGAKU KOGYO Co., Ltd.; NOCCELOR D) | 1 |
| sulfur (manufactured by TSURUMI KAGAKU Co., Ltd.; KINKA-mark fine powder sulfur | 1.5 |

A composition prepared in accordance with the above formulation was mixed in accordance with a conventional process. The prepared adhesive composition was added to 1,000 parts by mass of toluene (the δ-value: 18.2 MPa$^{1/2}$) as the organic solvent. The adhesive composition was dissolved or dispersed in the organic solvent, and an adhesive coating fluid was prepared.

Preparation Example 8 Preparation of Adhesive Composition-5 and a Coating Fluid

| Adhesive composition (the unit for the components: part by mass) | |
| --- | --- |
| Br-IIR (manufactured by JSR Co., Ltd.; BROMOBUTYL 2244) | 87 |
| chlorosulfonated polyethylene (manufactured by DU PONT PERFORMANCE ELASTOMERS Company; HYPALON) | 13 |
| carbon black (manufactured by TOKAI CARBON Co., Ltd.; SIEST NB) | 10 |
| phenol resin (manufactured by SUMITOMO BAKELITE Co., Ltd.; PR-SC-400) | 20 |
| stearic acid (manufactured by SHIN NIPPON RIKA Co., Ltd.; 50S) | 1 |
| zinc oxide (manufactured by HAKUSUI KAGAKU KOGYO Co., Ltd.; HAKUSUITECH) | 4 |
| p-dinitrosobenzene (manufactured by OUCHI SHINKO KAGAKU KOGYO Co., Ltd.; VULNOC DNB) | 4 |
| 1,4-phenylenedimaleimide (manufactured by OUCHI SHINKO KAGAKU KOGYO Co., Ltd.; VULNOC PM) | 4 |
| vulcanization accelerator (manufactured by OUCHI SHINKO KAGAKU KOGYO Co., Ltd.; NOCCELOR ZTC) | 1 |
| vulcanization accelerator (manufactured by OUCHI SHINKO KAGAKU KOGYO Co., Ltd.; NOCCELOR DM) | 0.5 |
| vulcanization accelerator (manufactured by OUCHI SHINKO KAGAKU KOGYO Co., Ltd.; NOCCELOR D) | 1 |
| sulfur (manufactured by TSURUMI KAGAKU Co., Ltd.; KINKA-mark fine powder sulfur | 1.5 |

A composition prepared in accordance with the above formulation was mixed in accordance with a conventional process. The prepared adhesive composition was added to 1,000 parts by mass of toluene (the δ-value: 18.2 MPa$^{1/2}$) as the organic solvent. The adhesive composition was dissolved or dispersed in the organic solvent, and an adhesive coating fluid was prepared.

Preparation Example 9 Preparation of Adhesive Composition-6 and a Coating Fluid

| Adhesive composition (the unit for the components: part by mass) | |
| --- | --- |
| Br-IIR (manufactured by JSR Co., Ltd.; BROMOBUTYL 2244) | 98 |
| chlorosulfonated polyethylene (manufactured by DU PONT PERFORMANCE ELASTOMERS Company; HYPALON) | 2 |
| carbon black (manufactured by TOKAI CARBON Co., Ltd.; SIEST NB) | 10 |
| phenol resin (manufactured by SUMITOMO BAKELITE Co., Ltd.; PR-SC-400) | 20 |
| stearic acid (manufactured by SHIN NIPPON RIKA Co., Ltd.; 50S) | 1 |
| zinc oxide (manufactured by HAKUSUI KAGAKU KOGYO Co., Ltd.; HAKUSUITECH) | 1 |
| p-dinitrosobenzene (manufactured by OUCHI SHINKO KAGAKU KOGYO Co., Ltd.; VULNOC DNB) | 1 |
| 1,4-phenylenedimaleimide (manufactured by OUCHI SHINKO KAGAKU KOGYO Co., Ltd.; VULNOC PM) | 1 |
| vulcanization accelerator (manufactured by OUCHI SHINKO KAGAKU KOGYO Co., Ltd.; NOCCELOR ZTC) | 1 |

-continued

| Adhesive composition (the unit for the components: part by mass) | |
|---|---|
| vulcanization accelerator (manufactured by OUCHI SHINKO KAGAKU KOGYO Co., Ltd.; NOCCELOR DM) | 0.5 |
| vulcanization accelerator (manufactured by OUCHI SHINKO KAGAKU KOGYO Co., Ltd.; NOCCELOR D) | 1 |
| sulfur (manufactured by TSURUMI KAGAKU Co., Ltd.; KINKA-mark fine powder sulfur | 1.5 |

A composition prepared in accordance with the above formulation was mixed in accordance with a conventional process. The prepared adhesive composition was added to 1,000 parts by mass toluene (the δ-value: 18.2 $MPa^{1/2}$) as the organic solvent. The adhesive composition was dissolved or dispersed in the organic solvent, and an adhesive coating fluid was prepared.

Example 1

The three-layered film (a thermoplastic polyurethane/a modified EVOH/a thermoplastic polyurethane) obtained in Preparation Example 2 was treated for crosslinking by irradiation with electron beam under the condition of a voltage of acceleration of 200 kV and an energy of irradiation of 30 Mrad using an apparatus for irradiation with electron beam manufactured by NISSHIN HIGH VOLTAGE Co., Ltd. (CURETRON EBC200-100; an apparatus for industrial production), and the obtained film was used as the multi-layered film of a thermoplastic resin.

Into 100 parts by mass of adhesive composition-1 obtained in Preparation Example 4, 1,000 parts by mass of toluene as the organic solvent was added, and an adhesive coating fluid was prepared by dissolving or dispersing the adhesive composition into the organic solvent. The prepared adhesive coating fluid was applied to one face of the multi-layered film of the thermoplastic resin crosslinked in the above. After the obtained coating film was treated for drying, the coating film was laminated to the sheet of an unvulcanized rubbery elastomer having a thickness of 500 μm which was obtained in Preparation Example 3, and an inner liner was prepared. Using the obtained inner liner, a pneumatic tire for passenger cars (195/65R15) was prepared as the test tire via the vulcanization step in accordance with the conventional process.

The results of the measurement of the average peel strength at temperatures of 23° C. and −20° C. and the property of the inner face of the test tire after being driven on a drum at temperatures of the environment of 23° C. and −20° C. are shown in Table 1.

The average peel strength at 23° C. and −20° C. and the property of the inner face of the test tire after being driven were measured and evaluated in accordance with the methods described in the following.

(1) Measurement of the Average Peel Strength

In accordance with the method of Japanese Industrial Standard K6854-3 [Adhesive—Test method of the peel strength of adhesion (T-type peeling)], the T-type peeling test was conducted at 23° C. and −20° C., and the average peel strength was measured. A test piece having a width of 10 mm was used for the test.

(2) Evaluation of the Property of the Inner Face of a Tire after being Driven

The test tire described above which was inflated at an internal air pressure of 140 kPa was pressed to a drum rotating at a speed corresponding to the driving speed of 80 km/h under a load of 6 kN and driven for 10,000 km at 23° C. or −20° C. The appearance of the inner liner in the tire after being driven on the drum was visually observed, and the condition of separation of the layer of the thermoplastic film was evaluated in accordance with the following criterion:

good: no separation of the layer of the film found, no problems poor: separation of the layer of the film found Example 2

The evaluation was conducted in accordance with the same procedures as those conducted in Example 1 except that adhesive composition-2 prepared in Preparation Example 5 was used in place of adhesive composition-1 prepared in Preparation Example 4. The results of the measurement of the average peel strength at temperatures of 23° C. and −20° C. and the property of the inner face of the test tire after being driven on a drum at temperatures of the environment of 23° C. and −20° C. are shown in Table 1.

Example 3

The evaluation was conducted in accordance with the same procedures as those conducted in Example 1 except that adhesive composition-3 prepared in Preparation Example 6 was used in place of adhesive composition-1 prepared in Preparation Example 4. The results of the measurement of the average peel strength at temperatures of 23° C. and −20° C. and the property of the inner face of the test tire after being driven on a drum at temperatures of the environment of 23° C. and −20° C. are shown in Table 1.

Example 4

The evaluation was conducted in accordance with the same procedures as those conducted in Example 1 except that adhesive composition-4 prepared in Preparation Example 7 was used in place of adhesive composition-1 prepared in Preparation Example 4. The results of the measurement of the average peel strength at temperatures of 23° C. and −20° C. and the property of the inner face of the test tire after being driven on a drum at temperatures of the environment of 23° C. and −20° C. are shown in Table 1.

Example 5

The evaluation was conducted in accordance with the same procedures as those conducted in Example 1 except that adhesive composition-5 prepared in Preparation Example 8 was used in place of adhesive composition-1 prepared in Preparation Example 4. The results of the measurement of the average peel strength at temperatures of 23° C. and −20° C. and the property of the inner face of the test tire after being driven on a drum at temperatures of the environment of 23° C. and −20° C. are shown in Table 1.

Comparative Example 1

The evaluation was conducted in accordance with the same procedures as those conducted in Example 1 except that adhesive composition-1 prepared in Preparation Example 4 was not used. The results of the measurement of the average peel strength at temperatures of 23° C. and −20° C. and the property of the inner face of the test tire after being driven on a drum at temperatures of the environment of 23° C. and −20° C. are shown in Table 1.

Comparative Example 2

The evaluation was conducted in accordance with the same procedures as those conducted in Example 1 except that a commercial adhesive composition, i.e., METALOCK R-46 manufactured by TOYO KAGAKU KENKYUSHO Co., Ltd., was used for the coating. The results of the measurement of the average peel strength at temperatures of 23° C. and −20° C. and the property of the inner face of the test tire after being driven on a drum at temperatures of the environment of 23° C. and −20° C. are shown in Table 1.

Comparative Example 3

The evaluation was conducted in accordance with the same procedures as those conducted in Example 1 except that adhesive composition-6 prepared in Preparation Example 9 was used in place of adhesive composition-1 prepared in Preparation Example 4. The results of the measurement of the average peel strength at temperatures of 23° C. and −20° C. and the property of the inner face of the test tire after being driven on a drum at temperatures of the environment of 23° C. and −20° C. are shown in Table 1.

TABLE 1

|  | Comparative Example | | | Example | | | | |
| --- | --- | --- | --- | --- | --- | --- | --- | --- |
|  | 1 | 2 | 3 | 1 | 2 | 3 | 4 | 5 |
| Adhesive composition | — | METALOCK R-46 | PE 9 | PE 4 | PE 5 | PE 6 | PE 7 | PE 8 |
| Three-layered film of thermoplastic resin | PE 2 | PE 2 | PE 2 | PE 2 | PE 2 | PE 2 | PE 2 | PE 2 |
| Unvulcanized sheet of rubbery elastomer | PE 3 | PE 3 | PE 3 | PE 3 | PE 3 | PE 3 | PE 3 | PE 3 |
| Average peel strength kN/m (−20° C.) | 2.1 | 1.7 | 5.5 | 8.5 | 14.5 | 6.3 | 12.0 | 9.5 |
| Average peel strength kN/m (23° C.) | 1.1 | 0.8 | 3.7 | 6.0 | 12.3 | 4.5 | 10.5 | 7.3 |
| Inner face of tire after being driven at −20° C. | poor | poor | poor | good | good | good | good | good |
| Inner face of tire after being driven at 23° C. | poor | poor | poor | good | good | good | good | good |

Note:
PE: Preparation Example

INDUSTRIAL APPLICABILITY

The present invention can provide the pneumatic tire exhibiting excellent average peel strength between the surface of the layer of a single-layered or multi-layered film of a thermoplastic resin and the rubber elastic layer, which are used in combination for the inner liner layer, at a low temperature and at the room temperature.

The invention claimed is:

1. A pneumatic tire which comprises an inner liner layer comprising (A) a layer of a single-layered or multi-layered film of a thermoplastic resin disposed as an innermost layer in a radial direction of the tire and (B) a rubber elastic layer disposed at outside of layer (A) and inside a carcass layer in a radial direction of the tire, wherein an average peel strength between a surface of the layer of a single-layered or multi-layered film of a thermoplastic resin of layer (A) and the rubbery elastic layer of layer (B) is 6 kN/m or greater at −20° C., wherein the pneumatic tire exhibits excellent gas barrier property and flexibility at both low temperature and room temperature.

2. A pneumatic tire according to claim 1, wherein the layer of a single-layered or multi-layered film of a thermoplastic resin of layer (A) and the rubbery elastic layer of layer (B) disposed adjacent to layer (A) are adhered to each other via (C) an adhesive layer, and the average peel strength between the surface of layer (A) and layer (B) via layer (C) is 6 kN/m or greater at −20° C.

3. A pneumatic tire which comprises an inner liner layer comprising (A) a layer of a single-layered or multi-layered film of a thermoplastic resin disposed as an innermost layer in a radial direction of the tire and (B) a rubber elastic layer disposed at outside of layer (A) and inside a carcass layer in a radial direction of the tire, wherein an average peel strength between a surface of the layer of a single-layered or multi-layered film of a thermoplastic resin of layer (A) and the rubbery elastic layer of layer (B) is 4 kN/m or greater at 23° C., wherein the pneumatic tire exhibits excellent gas barrier property and flexibility at both low temperature and room temperature.

4. A pneumatic tire according to claim 3, wherein the layer of a single-layered or multi-layered film of a thermoplastic resin of layer (A) and the rubbery elastic layer of layer (B) disposed adjacent to layer (A) are adhered to each other via (C) an adhesive layer, and the average peel strength between the surface of layer (A) and layer (B) via layer (C) is 4 kN/m or greater at 23° C.

5. A pneumatic tire according to claim 2, wherein the average peel strength between the surface of layer (A) and layer (B) disposed adjacent to layer (A) via layer (C) is 6 kN/m or greater at −20° C. and 4 kN/m or greater at 23° C.

6. A pneumatic tire according to claim 1, wherein the average peel strength is 10 kN/m or greater at −20° C.

7. A pneumatic tire according to claim 3, wherein the average peel strength is 10 kN/m or greater at 23° C.

8. A pneumatic tire according claim 1, wherein the layer of a single-layered or multi-layered film of a thermoplastic resin of layer (A) comprises a layer consisting a modified ethylene-vinyl alcohol copolymer which is obtained by bringing 1 to 50 parts by weight of an epoxy compound into reaction with 100 parts by mass of an ethylene-vinyl alcohol copolymer having an ethylene content of 25 to 50% by mole.

9. A pneumatic tire according to claim 1, wherein a thermoplastic urethane-based elastomer is used for a surface layer of the layer of a single-layered or multi-layered film of a thermoplastic resin of layer (A).

10. A pneumatic tire according to claim 1, wherein butyl rubber or a halogenated butyl rubber is used for the rubbery elastic layer of layer (B).

11. A pneumatic tire according to claim 1, wherein a diene-based elastomer is used for the rubbery elastic layer of layer (B).

12. A pneumatic tire according to claim 1, wherein the surface of the layer of a single-layered or multi-layered film of a thermoplastic resin of layer (A) and the rubbery elastic layer of layer (B) disposed adjacent to layer (A) are adhered to each other by using (D) an adhesive composition constituting the adhesive layer of layer (C) disposed between layer (A) and layer (B).

13. A pneumatic tire according to claim 12, wherein the adhesive composition of component (D) comprises (a) a rubber component and (b) at least one of poly-p-dinitrosobenzene and 1,4-phenylenedimaleimide as a crosslinking and auxiliary crosslinking agent in an amount of 0.1 part by mass or greater per 100 parts by mass of component (a).

14. A pneumatic tire according to claim 12, wherein the rubber component, of component (a) in the adhesive composition of component (D) comprises 10% by mass or greater of chlorosulfonated polyethylene.

15. A pneumatic tire according to claim 12, wherein the adhesive composition of component (D) further comprises 2 to 50 parts by mass of (c) a filler.

16. A pneumatic tire according to claim 15, wherein the adhesive composition of component (D) comprises carbon black as the filler of component (c).

17. A pneumatic tire according to claim 12, wherein the rubber component of component (a) in the adhesive composition of component (D) comprises 50% by mass or greater of butyl rubber and/or a halogenated butyl rubber.

18. A pneumatic tire according to claim 12, wherein the adhesive composition of component (D) further comprises 0.1 part by mass or greater of (d) a vulcanization accelerator for rubber.

19. A pneumatic tire according to claim 18, wherein the vulcanization accelerator for rubber of component (d) is a thiuram-based and/or substituted dithiocarbamate-based vulcanization accelerator.

20. A pneumatic tire according to claim 12, wherein the adhesive composition of component (D) further comprises (e) 0.1 part by weight or greater of (e) at least one of resins and low molecular weight polymers.

21. A pneumatic tire according to claim 20, wherein the resin of component (e) is at least one resin selected from C5-based resins, phenol-based resins, terpene-based resins, modified terpene-based resins, hydrogenated terpene-based resins and rosin-based resins.

22. A pneumatic tire according to claim 21, wherein the resin of component (e) is a phenol-based resin.

23. A pneumatic tire according to claim 20, wherein the low molecular weight polymer of component (e) has a weight-average molecular weight of 1,000 to 100,000 as expressed by a weight-average molecular weight of corresponding polystyrene.

24. A pneumatic tire according to claim 23, wherein the low molecular weight polymer of component (e) has a weight-average molecular weight of 1,000 to 50,000 as expressed by a weight-average molecular weight of corresponding polystyrene.

25. A pneumatic tire according to claim 20, wherein the low molecular weight polymer of component (e) is a polymer having double bond in a molecule.

26. A pneumatic tire according to claim 20, wherein the low molecular weight polymer of component (e) is a polymer having a styrene unit.

27. A pneumatic tire according to claim 26, wherein the low molecular weight polymer of component (e) is a styrene-butadiene copolymer.

28. A pneumatic tire according to claim 1, wherein the rubbery elastic layer has a thickness between 20 μm and 500 μm, inclusive.

29. A pneumatic tire according to claim 3, wherein the rubbery elastic layer has a thickness between 20 μm and 500 μm, inclusive.

* * * * *